US012075457B2

(12) United States Patent
Gao et al.

(10) Patent No.: US 12,075,457 B2
(45) Date of Patent: Aug. 27, 2024

(54) SYSTEMS AND METHODS FOR CHANNEL PROPERTY ASSUMPTION DETERMINATION

(71) Applicant: ZTE CORPORATION, Guangdong (CN)

(72) Inventors: Bo Gao, Guangdong (CN); Zhaohua Lu, Guangdong (CN); Yijin Chen, Guangdong (CN); Hao Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 568 days.

(21) Appl. No.: 17/164,237

(22) Filed: Feb. 1, 2021

(65) Prior Publication Data

US 2021/0160893 A1 May 27, 2021

Related U.S. Application Data

(63) Continuation of application No. PCT/CN2018/098350, filed on Aug. 2, 2018.

(51) Int. Cl.
*H04W 72/10* (2009.01)
*H04B 7/06* (2006.01)
(Continued)

(52) U.S. Cl.
CPC .......... *H04W 72/56* (2023.01); *H04B 7/0617* (2013.01); *H04W 72/0446* (2013.01)

(58) Field of Classification Search
CPC . H04W 72/56; H04W 72/0446; H04B 7/0617
(Continued)

(56) References Cited

U.S. PATENT DOCUMENTS

2017/0188371 A1* 6/2017 Kim .................. H04L 1/0015
2018/0054797 A1 2/2018 Islam et al.
(Continued)

FOREIGN PATENT DOCUMENTS

CN 108023722 A 5/2018
CN 108092697 A 5/2018
(Continued)

OTHER PUBLICATIONS

ZTE: "Simultaneous transmission and reception of different channels and reference signals", 3GPP TSG RAN WG1 Meeting #93, R1-1805830, Busan, Korea; May 21, 2018-May 25, 2018, May 11, 2018 (May 11, 2018), 4 pages.
(Continued)

*Primary Examiner* — Faisal Choudhury
(74) *Attorney, Agent, or Firm* — Duane Morris LLP

(57) ABSTRACT

A system and method for determining a channel property assumption (CPA) for signal reception are disclosed herein. In an embodiment, a method performed by a communication device includes: associating each of multiple signals with at least one associated CPA, wherein the multiple signals are at least partially overlapped in a time domain; selecting at least one CPA based on a selection rule, the at least one selected CPA is selected from a set of CPAs, and the set of CPAs includes the at least one associated CPA associated with each of the multiple signals; and receiving at least one signal of the multiple signals from a communication node based on the at least one selected CPA.

19 Claims, 10 Drawing Sheets

(51) Int. Cl.
*H04W 72/04* (2023.01)
*H04W 72/0446* (2023.01)
*H04W 72/56* (2023.01)

(58) Field of Classification Search
USPC ........................................................ 370/336
See application file for complete search history.

(56) References Cited

U.S. PATENT DOCUMENTS

| | | | | |
|---|---|---|---|---|
| 2018/0242327 | A1* | 8/2018 | Frenne | H04L 5/0062 |
| 2020/0045569 | A1* | 2/2020 | Seo | H04W 72/56 |
| 2021/0084623 | A1* | 3/2021 | Zhang | H04W 72/56 |

FOREIGN PATENT DOCUMENTS

| | | |
|---|---|---|
| CN | 108093480 A | 5/2018 |
| CN | 108199819 A | 6/2018 |
| CN | 108289017 A | 7/2018 |
| KR | 20090017394 A * | 1/2008 |
| RU | 2768851 C1 * | 3/2022 ........... H04B 17/373 |

OTHER PUBLICATIONS

Vivo: "Remaining issues on simultaneous reception of DL/UL physical channels and reference signals", 3GPP TSG RAN WG1 Meeting #93, R1-1806047, Busan, Korea; May 21, 2018-May 25, 2018, May 20, 2018 (May 20, 2018), 7 pages.

Qualcomm Incorporated: "Remaining Details on QCL", 3GPP TSG RAN WG1 Meeting #93, R1-1807398, Busan, Korea; May 21, 2018-May 25, 2018, May 20, 2018 (May 20, 2018), 10 pages.

LG Electronics: "Remaining issues on PDCCH structure", 3GPP TSG RAN WG1 Meeting #93, R1-1806615, Busan, Korea; May 21, 2018-May 25, 2018, May 20, 2018 (May 20, 2018), 4 pages.

3GPP TSG RAN, "Physical layer procedures for data", 3GPP TS 38.214 V15.2.0, Jun. 30, 2018 (Jun. 30, 2018), 98 pages.

* cited by examiner

SYSTEMS AND METHODS FOR CHANNEL PROPERTY ASSUMPTION DETERMINATION

TECHNICAL FIELD

This disclosure relates generally to wireless communications and, more particularly, to systems and methods for determining a channel property assumption for signal reception.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

As resources approach use of the wide or ultra-wide spectrum, the considerable propagation loss induced by use of extremely high frequencies becomes a noticeable challenge. To solve this, antenna array and beamforming (BF) training technologies, such as massive multiple input and multiple output (MIMO) (e.g., use of around 1024 antenna element for one node), have been adopted to achieve beam alignment and obtain high antenna gain. Also, to lower implementation cost for an antenna array, analog phase shifters may be utilized for implementing millimeter (mm) wave beam forming (BF). This means that the number of phases is finite and modulus constraints are placed on these antenna elements. Thereby, given pre-specified beam patterns, variable-phase-shift-based BF training targets are used to identify patterns for subsequent data transmission.

Generally, multiple transmission and reception points (TRP) and multiple panel antennas are utilized for 5G base stations (BS). Also, user equipment (UE) may utilize multiple panel antennas for better spatial coverage. As an example, a panel antenna for BS and UE communications may include two transmission and reception units (TXRUs), which are associated with cross polarization. Therefore, in order to achieve a high rank indication (RANK) or multi-layer (e.g., independent data stream) transmission, the BS and UE may use different beams generated from different panel antennas to better utilize the capability of each panel antenna and each panel antenna's associated TXRUs.

A UE may perform radio link monitoring (RLM) to monitor downlink radio link quality of a serving cell (e.g., a BS within a particular geographic area) in a connected state (e.g., RRC_CONNECTED). RLM is performed by monitoring for a reference signal (RS), sent by a BS, that includes a channel state information reference signal (CSI-RS) or synchronization signal block (SSB). By performing RLM, a UE in a connected state with a BS may determine whether it is in-sync or out-of-sync with respect to its serving cell.

FIG. 1 illustrates a network diagram 100 of BS panel antennas 102 transmitting to UE panel antennas 104, in accordance with some embodiments. As illustrated, the UE has four panels, the number of panels in each direction (Mg,Ng)=(1, 4). Also, a boresight direction of a panel (Θmg,ng)=90; Ω0,1=Ω0,0+90; Ω0,2=Ω0,0+180; Ω0,3=Ω0,0+270. Lastly, a distance between panels (dgH, dgV)=(0,0).

The BS panel antennas 102 may be part of rectangular panel array 106 that is part of a BS 108. Accordingly, the panel array 106 may include a plurality of BS panel antennas 102. Although only nine BS panel antennas 102 are illustrated for each panel array 106, BS panel arrays 106 may include any number of one or more BS panel antennas.

Each of the BS panel antennas 102 may include one or more antenna elements. The panel antennas at the BS may produce transmitter beams 110 (also termed as Tx beam). The Tx beams 110 may pass a physical cluster (e.g., a physical environment that the transmission beam 110 may pass through or bounce off of, such as buildings, objects, walls, etc.) to reach the UE panel antennas 104. Stated another way, the panel antennas may form directional beams 110 (e.g., the Tx beams) directed toward the location of the UE panel antennas 104 for reception of the directional beams (e.g., the Tx beams) at the UE panel antennas 104. Also, as discussed below but not illustrated, each of the UE panel antennas 104 may include antenna elements that may produce a receiver beam (also termed as a Rx beam) for reception by the BS 108 at the antenna elements of the BS panel antennas 102.

Regarding downlink (DL) transmissions, there may be two types of resources (e.g., code, time, space, and frequency domain resources). These two types of resources are semi-statically scheduled resources and dynamically scheduled resources. For semi-statically scheduled (e.g., periodic or semi-persistent) resources, a BS (e.g., a gNB) can semi-statically schedule the periodic resources of control channel or semi-persistent scheduling (SPS) with configured a channel property assumption (CPA). A CPA may describe a particular configuration of antennas for reception or transmission of a particular beam. SPS scheduling can be activated or deactivated by a medium access control element (MAC-CE) or downlink control information (DCI) rather than radio resource control (RRC), and can be used for configuring periodic scheduling. However, in certain implementations, control channels monitored by a UE may not be transmitted if not configured for transmission by a BS. Stated another way, a BS may configure periodic resources for transmission for detection by the UE.

For dynamically scheduled (e.g., aperiodic) resources, resources are dynamically scheduled on a data channel by DCI signaling. Typically, the associated CPA is also being configured while each resource is configured. For example, if the resource is dynamically scheduled, the CPA is also determined dynamically. Similarly, if the resource is semi-statically scheduled, the CPA is also determined semi-statically.

A data channel (e.g., a physical downlink shared channel (PDSCH)) whose scheduled offset from a corresponding scheduled physical downlink control channel (PDCCH) (e.g., in the DCI field) is less than a threshold K (e.g., 7, 14, 28 orthogonal frequency division multiplexing (OFDM) symbols as predetermined), may be referred to as an imaginary PDSCH (i-PDSCH). Typically, resources of an i-PDSCH may be determined dynamically, but the CPA may be determined semi-statically as the control resource set (CORESET) with the lowest CORESET identifier (e.g., lowest value of a CORESET identifier). Also, typically, the potential CPA of an i-PDSCH is unique for one time instance irrespective of scheduling signaling. In contrast, a data channel (e.g., PDSCH) whose scheduled offset is more than the same threshold K may be referred to as a real PDSCH (r-PDSCH).

SUMMARY OF THE INVENTION

The exemplary embodiments disclosed herein are directed to solving the issues relating to one or more of the problems presented above, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In an embodiment, a method performed by a communication device includes: associating each of multiple signals with at least one associated channel property assumption (CPA), and the multiple signals are at least partially overlapped in a time domain; selecting at least one CPA based on a selection rule, and the at least one selected CPA is selected from a set of CPAs, wherein the set of CPAs includes the at least one associated CPA associated with each of the multiple signals; and receiving at least one signal of the multiple signals from a communication node based on the at least one selected CPA.

In an embodiment, a method performed by a communication device includes: associating each of multiple signals with at least one associated channel property assumption (CPA), and the multiple signals are at least partially overlapped in a time domain; and receiving the multiple signals from a communication node, wherein the multiple signals meet at least one transmission condition.

In an embodiment, a method performed by a communication node includes: generating associations between each of multiple signals and at least one associated channel property assumption (CPA), and the multiple signals are at least partially overlapped in a time domain; transmitting the associations to a communication device; and transmitting the multiple signals to the communication device, and the communication device is configured to: select at least one CPA based on a selection rule, and the at least one selected CPA is selected from a set of CPAs, and the set of CPAs includes the at least one associated CPA associated with each of the multiple signals; and receive at least one signal of the multiple signals based on the at least one selected CPA.

In an embodiment, a method performed by a communication node includes: generating associations between each of multiple signals and at least one associated channel property assumption (CPA), and the multiple signals are at least partially overlapped in a time domain, and wherein the multiple signals meet at least one transmission condition; transmitting the associations to a communication device; and transmitting the multiple signals to the communication device.

In an embodiment, a communication device includes: at least one processor configured to: associate each of the multiple signals with at least one associated channel property assumption (CPA), and the multiple signals are at least partially overlapped in a time domain, and each of the multiple signals is associated with at least one channel property assumption of a set of channel property assumptions; and select at least one CPA based on a selection rule, and the at least one selected CPA is selected from a set of CPAs, and the set of CPAs includes the at least one associated CPA associated with each of the multiple signals; and a receiver configured to: receive at least one signal of the multiple signals from a communication node based on the at least one selected CPA.

In an embodiment, a communication device includes: at least one processor configured to: associate each of multiple signals with at least one associated channel property assumption (CPA), and the multiple signals are at least partially overlapped in a time domain; and a receiver configured to: receive the multiple signals from a communication node, wherein the multiple signals meet at least one transmission condition.

In an embodiment, a communication node includes: at least one processor configured to: generate associations between each of multiple signals and at least one associated channel property assumption (CPA), and the multiple signals are at least partially overlapped in a time domain; and a transmitter configured to: transmit the associations to a communication device; and transmit the multiple signals to the communication device, and the communication device is configured to: select at least one CPA based on a selection rule, and the at least one selected CPA is selected from a set of CPAs, and the set of CPAs includes the at least one associated CPA associated with each of the multiple signals; and receive at least one signal of the multiple signals based on the at least one selected CPA.

In an embodiment, a communication node includes: at least one processor configured to: generate associations between each of multiple signals and at least one associated channel property assumption (CPA), and the multiple signals are at least partially overlapped in a time domain, and wherein the multiple signals meet at least one transmission condition; and a transmitter configured to: transmit the associations to a communication device; and transmit the multiple signals to the communication device.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

As described below, the discussion below may refer to functional entities, such as a BS, UE, cell, etc. (either in physical or virtual form), which are similar to those mentioned above with respect to conventional communication systems. As would be understood by persons of ordinary skill in the art, however, such conventional functional entities do not perform the functions described below, and therefore, would need to be modified or specifically configured to perform one or more of the operations described below. Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Figure 1:
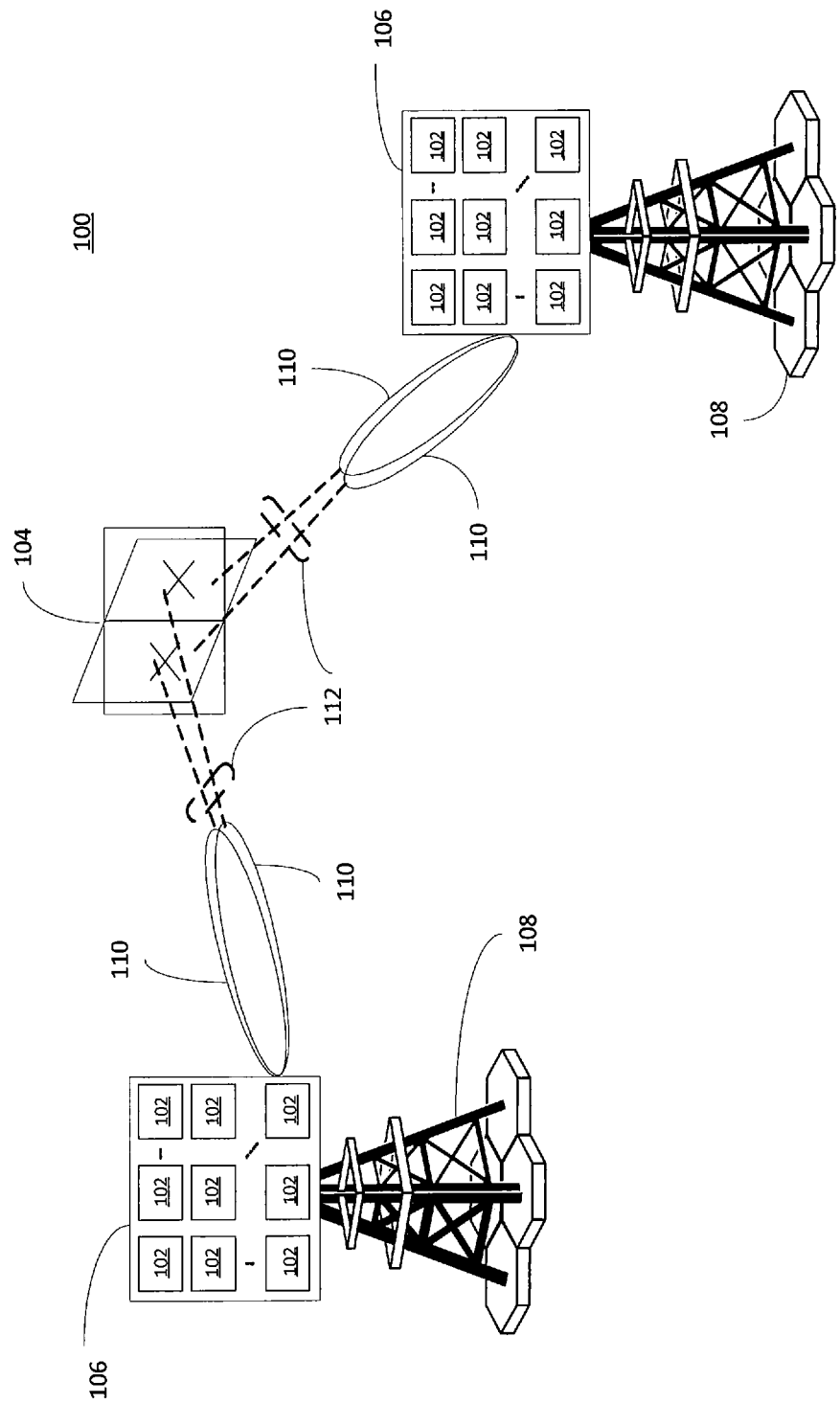
FIG. 1 illustrates a network diagram of base station panel antennas transmitting to user equipment panel antennas.
Figure 2:
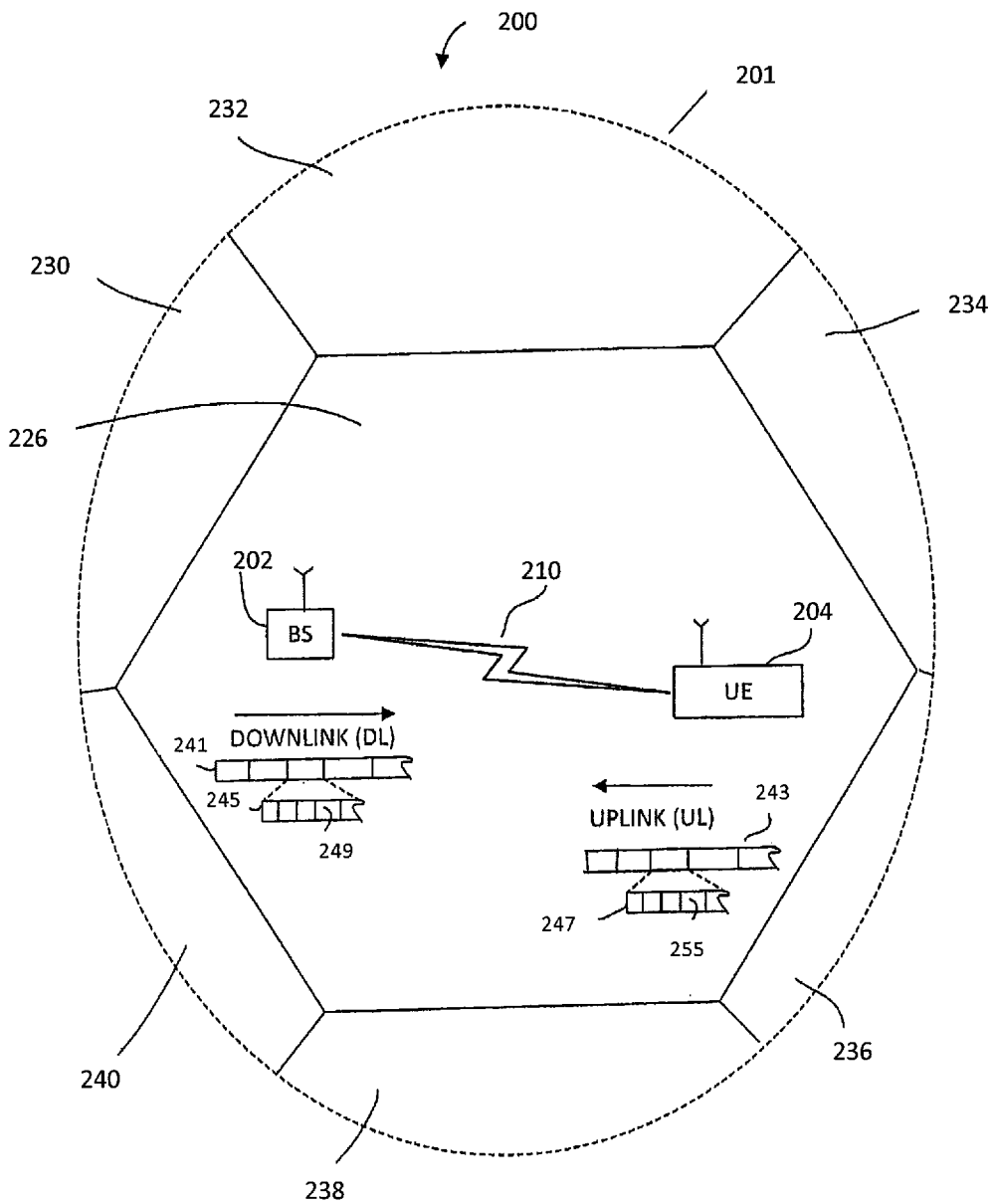
FIG. 2 illustrates an exemplary cellular communication network in which techniques disclosed herein may be implemented, in accordance with an embodiment of the present disclosure.

FIG. 2 illustrates an exemplary wireless communication network 200 in which techniques disclosed herein may be implemented, in accordance with an embodiment of the present disclosure. The exemplary communication network 200 may overlay a geographic area 201 and include a base station (BS) 202 and a user equipment (UE) device 204 that can communicate with each other via a communication link 210 (e.g., a wireless communication channel), and a cluster of notional cells 226, 230, 232, 234, 236, 238 and 240. In FIG. 2, the BS 202 and UE 204 are contained within the geographic boundary of cell 226. Each of the other cells 230, 232, 234, 236, 238 and 240 may include at least one base station (BS) operating at its allocated bandwidth to provide adequate radio coverage to its intended users. For example, the BS 202 may operate at an allocated channel transmission bandwidth to provide adequate coverage to the UE 204. The BS 202 and the UE 204 may communicate via a downlink radio frame 241, and an uplink radio frame 243 respectively. Each radio frame 245/247 may be further divided into sub-frames 249/251 which may include data symbols 253/255. Accordingly, reference to a cell may also be a short hand reference to a BS with an associated coverage region or area.

In the present disclosure, the base station (BS) 202 and user equipment (UE) 204 are described herein as non-limiting examples of "communication nodes," generally, which can practice the methods disclosed herein. Such communication nodes may be capable of wireless and/or wired communications, in accordance with various embodiments of the invention. Each of these communication nodes may be a transmitter in one situation and a receiver in another situation. For example, a BS 202 may transmit to a UE 204, such as during a downlink (DL), discussed further below. Therefore, the BS 202 may be a transmitter and the UE 204 may be a receiver. However, in another situation (such as during an uplink (UL), described further below) the UE 204 may be a transmitter and the BS 202 may be a receiver. Accordingly, both the BS 202 and the UE 204 may be a receiver or a transmitter for advanced random access preamble transmissions, as will be discussed further below. In certain embodiments, for purposes of differentiation, a communication device may refer to a UE while a communication node may refer to a BS.

Figure 3:
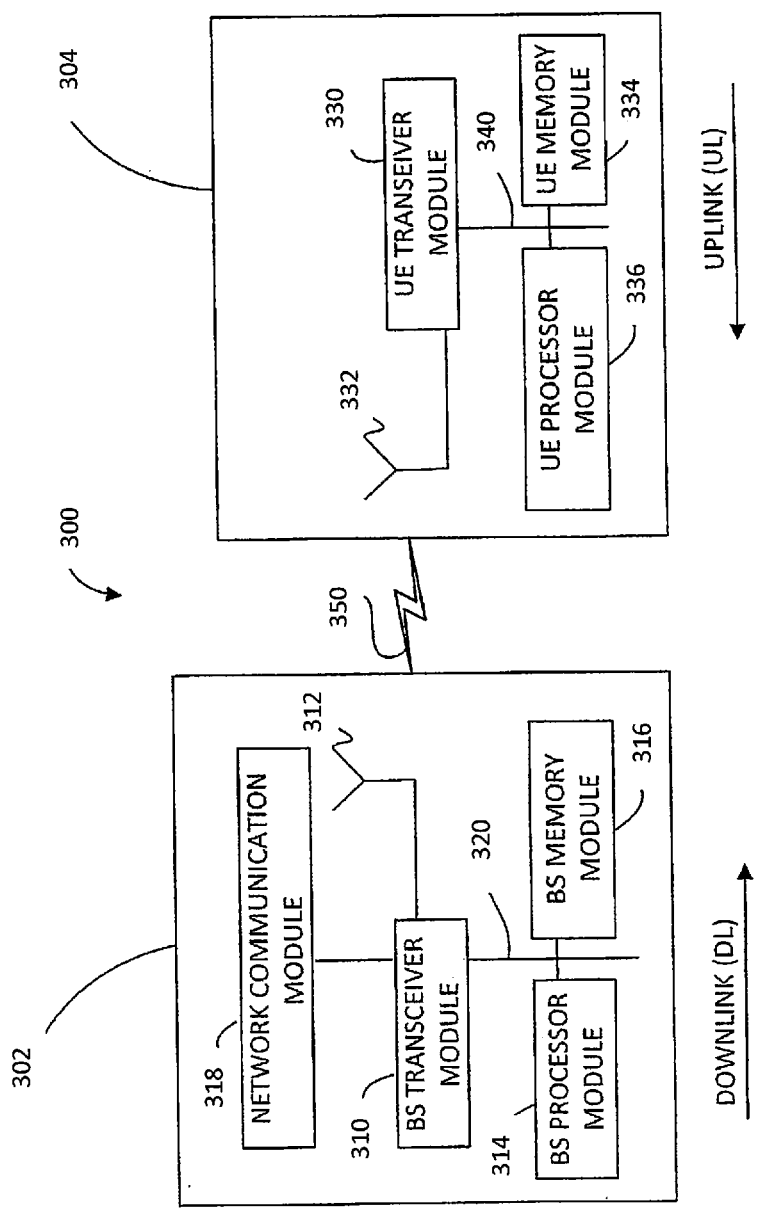
FIG. 3 illustrates block diagrams of an exemplary base station and a user equipment device, in accordance with some embodiments of the present disclosure.

FIG. 3 illustrates block diagrams of an exemplary system 300 including a base station (BS) 302 and user equipment (UE) 304 for transmitting and receiving wireless communication signals (e.g., OFDM/OFDMA signals) between each other. The system 300 may include components and elements configured to support known or conventional operating features that need not be described in detail herein. In one exemplary embodiment, system 300 can be used to transmit and receive data symbols in a wireless communication environment such as the wireless communication environment 200 of FIG. 2, as described above.

The BS 302 includes a BS transceiver module 310, a BS antenna 312, a BS processor module 314, a BS memory module 316, and a network communication module 318, each module being coupled and interconnected with one another as necessary via a data communication bus 320. The UE 304 includes a UE transceiver module 330, a UE antenna 332, a UE memory module 334, and a UE processor module 336, each module being coupled and interconnected with one another as necessary via a data communication bus 340. The BS 302 communicates with the UE 304 via a communication channel (e.g., link) 350, which can be any wireless channel or other medium known in the art suitable for transmission of data as described herein.

As would be understood by persons of ordinary skill in the art, system 300 may further include any number of modules other than the modules shown in FIG. 3. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 330 may be referred to herein as an "uplink" transceiver 330 that includes a RF transmitter and receiver circuitry that are each coupled to the antenna 332. A duplex switch (not shown) may alternatively couple the uplink transmitter or receiver to the uplink antenna in time duplex fashion. Similarly, in accordance with some embodiments, the BS transceiver 310 may be referred to herein as a "downlink" transceiver 310 that includes RF transmitter and receiver circuity that are each coupled to the antenna 312. A downlink duplex switch may alternatively couple the downlink transmitter or receiver to the downlink antenna 312 in time duplex fashion. The operations of the two transceivers 310 and 330 are coordinated in time such that the uplink receiver is coupled to the uplink antenna 332 for reception of transmissions over the wireless transmission link 350 at the same time that the downlink transmitter is coupled to the downlink antenna 312. Preferably there is close time synchronization with only a minimal guard time between changes in duplex direction.

The UE transceiver 330 and the base station transceiver 310 are configured to communicate via the wireless data communication link 350, and cooperate with a suitably configured RF antenna arrangement 312/332 that can support a particular wireless communication protocol and modulation scheme. In some exemplary embodiments, the UE transceiver 308 and the base station transceiver 310 are configured to support industry standards such as the Long Term Evolution (LTE) and emerging 5G and New Radio (NR) standards, and the like. It is understood, however, that the invention is not necessarily limited in application to a particular standard and associated protocols. Rather, the UE transceiver 330 and the base station transceiver 310 may be configured to support alternate, or additional, wireless data communication protocols, including future standards or variations thereof.

In accordance with various embodiments, the BS 302 may be a next generation nodeB (gNodeB or gNB), serving gNB, target gNB, transmission reception point (TRP), evolved node B (eNB), a serving eNB, a target eNB, a femto station, or a pico station, for example. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 314 and 336, respectively, such that the processors modules 314 and 336 can read information from, and write information to, memory modules 316 and 334, respectively. The memory modules 316 and 334 may also be integrated into their respective processor modules 314 and 336. In some embodiments, the memory modules 316 and 334 may each include a cache memory for storing temporary variables or other intermediate information during execution of instructions to be executed by processor modules 314 and 336, respectively. Memory modules 316 and 334 may also each include non-volatile memory or non-transitory memory for storing instructions (e.g., computer readable instructions) to be executed by the processor modules 314 and 336, respectively.

The network communication module 318 generally represents the hardware, software, firmware, processing logic, and/or other components of the base station 302 that enable bi-directional communication between base station transceiver 310 and other network components and communication nodes configured to communication with the base station 302. For example, network communication module 318 may be configured to support internet or WiMAX traffic. In a typical deployment, without limitation, network communication module 318 provides an 802.3 Ethernet interface such that base station transceiver 310 can communicate with a conventional Ethernet based computer network. In this manner, the network communication module 318 may include a physical interface for connection to the computer network (e.g., Mobile Switching Center (MSC)).

In various embodiments, a beam may refer to reference signalling, spatial filter or precoding. For example, a transmission beam, or Tx beam may refer to Tx spatial filter or Tx precoding, and/or downlink/uplink (DL/UL) reference signalling. Examples of DL/UL reference signalling may include channel state information reference signaling (CSI-RS), synchronization signaling block (SSB) (which is also referred to as a synchronization signal/physical broadcast channel (SS/PBCH)), demodulation reference signalling (DMRS), and sounding reference signalling (SRS). As another example, a receiver beam, or Rx beam, may refer to a spatial filter, Rx spatial filter or Rx precoding. Also, a beam identifier, or beam ID may refer to a reference signalling index, spatial filter index or precoding index.

As noted above, a channel property assumption (CPA) may describe a particular configuration of antennas for reception or transmission of a particular beam or group of beams. Accordingly, a CPA may be a proxy for a beam or a group of beams (e.g., a beam group). In certain embodiments, CPA may refer to one or more RS sets, each of which contains one or more reference RSs and their corresponding channel property (CP) parameters, where channel property parameters include at least one of the following aspect or combination: Doppler spread, Doppler shift, delay spread, average delay, average gain, and/or a spatial parameter. Also, a CPA may also refer to a quasi-co-location (QCL), spatial QCL, transmission configuration indication (TCI), spatial filter, or antenna group. Also, a spatial filter may be on either a UE-side or BS side.

Furthermore, in certain embodiments, reference to a different CPA may refer to a situation where a certain number of reference signals (RSs) associated with a spatial parameter of CPA of the DL RSs or channels are different, irrespective of other channel property parameters mentioned above. Also, in further embodiments, reference to a different CPA may refer to a situation where any RSs associated with any channel property parameters of CPA of the DL RSs or channels are different.

Furthermore, in certain embodiments, reference to a same CPA may refer to a situation where a certain number of RS associated with a spatial parameter of a CPA of DL RSs or channels are the same, irrespective of other channel property parameters mentioned above. Also, in further embodiments, reference to a same CPA may refer to a situation where RSs associated with channel property parameters of QCL, of DL RSs, or of channels are the same.

Furthermore, in certain embodiments, reference to DL RSs or channels having the same CPA refers to DL RSs or channels that are QCLed, or DL RSs or channels that are QCLed with regard to a spatial parameter.

In particular embodiments, a beam group may refer to different beams within one antenna group that may be simultaneously received or transmitted. However, beams between different antenna groups in certain embodiments cannot be simultaneously received.

In additional embodiments, certain antenna groups with different beams within one group cannot be simultaneously received or transmitted. However, beams between different groups can be simultaneously received or transmitted. Also, in certain antenna groups, more than N (e.g., an arbitrary positive integer value) different beams within one group cannot be simultaneously received or transmitted, but no more than N different beams within one group can be simultaneously received or transmitted, where beams between different groups can be simultaneously received or transmitted.

For ease of discussion, reference to a CPA being prioritized, determined, or selected refers to a CPA being prioritized over, selected over, or overridden over, an original CPA associated with a signal or a previously associated CPA.

Beam management in operations above 6 gigahertz (GHz) may utilize one single carrier and single panel or transmission reception point (TRP). However, new specifications may also consider multi-slot transmission, carrier aggregation, and multi panel/TRP. In such new specifications, the DL RSs and channels may be scheduled dynamically and independently for different carriers, panels and TRPs. These may be coordinated to compensate for ideal or non-ideal backhaul. Consequently, for beam management, semi-static scheduled transmissions and aperiodic transmissions, which have different CPAs, may occur frequently in a same time instance.

Simultaneous reception of DL RSs and channels may be limited depending on UE capability (e.g., the number of UE-side independent antenna panels). For instance, one UE with two antenna panels may simultaneously receive multiple RS or channels, all of which are associated with no more than two separate angles of arrival (AoA). But, in one time instance, the UE may monitor control channels (e.g., from different component carriers (cc), or different carriers in a carrier aggregation (CA) implementation), all of which are associated with more than two spatial parameters (e.g., more than two Tx beams or AoAs). This may be more than the UE can support if the UE can support in one time instance a maximum of two spatial parameters.

Accordingly, systems and methods in accordance with various embodiments may provide solutions to technical problems related to having received signals at a UE associated with more channel property assumptions (CPAs) (e.g., spatial parameters that determine how signals may be properly received and demodulated at a UE) than the UE can support for demodulation. For example, a technical problem may occur when signals with different CPAs overlap in the time domain. This overlap may be a full overlap or a partial overlap. A rule that specifies that the UE should utilize the CPA of the higher priority signal during the overlap may be insufficient or problematic as the lower priority signal is then associated with two CPAs (e.g., the CPA of the higher priority signal and the original CPA of the lower priority signal). Demodulation cannot be properly performed when a single signal is associated with more than one CPA as the demodulation reference signal (DMRS) of different CPAs cannot be used with each other for demodulation.

As another example, a technical problem may occur when reusing a CPA. A rule that specifies that a CPA from a latest slot should be may be insufficient or problematic when CPAs for different signals are different. For example, a PDSCH with scheduled offset<threshold may be configured to re-use the same CPA as a PDCCH resource set (e.g., a CORESET with a lowest ID in the latest slot). But, in carrier aggregation (CA), the PDSCH's CPAs for different CCs may be different. Consequently, a UE may have difficulty demodulating the PDSCH when the UE is unable to handle the multiple CPAs at the same time.

As yet another example, a technical problem may occur when using non-coherent transmissions when only one CPA can be indicated for each channel. Non-coherent transmissions may be based on having a non-ideal backhaul where one channel can be transmitted from two or more transmission points (TRPs) and be associated with different DMRS port groups. Generally, the AoAs from different TRPs can be different. Thus, for non-coherent transmissions, a UE should support multiple CPAs for each channel. However, non-coherent transmissions of a single channel from multiple TRPs to a UE may be problematic when the UE can only support one CPA for each channel.

As a first exemplary embodiment, CPAs may be determined in accordance with a rule (e.g., a CPA selection rule) based upon an overlap between received signals. For example, when two or more channels (e.g., signals within a channel) are overlapped and have different CPAs, the CPA for the higher priority channel may be selected or prioritized over the lower priority channel. However, when the two channels are partially and not fully overlapped, there may be two or more CPAs associated with the different overlapping channels. This may be problematic as there may not be an DMRS for at least one of the overlapping channels due to the multiple associated CPAs. As noted above, a DMRS may be distributed in a transmission period, but there may not be an DMRS when there are multiple different CPAs for a single signal or channel. The transmission period may be a continuous amount of time taken to transmit a particular set of signals. Data may not be properly demodulated when there is not an DMRS (e.g., due to having multiple different CPAs for a single signal or channel).

As another example, a multi-slot PDSCH may have the same CPA across multiple slots to obtain gains due to multi-slot repetition. A multi-slot PDSCH may refer to a slot aggregated PDSCH. However, a requirement for PDSCH aggregation may not be met when the CPA for a portion of the PDSCH is overridden due to the overlap between the received signals. Accordingly, the CPA for a transmission period may be kept unchanged (e.g., not be selected as another CPA or overridden by another CPA) in certain embodiments.

In certain embodiments, irrespective of fully or partially overlapped cases, a CPA of a whole transmission period (e.g., duration of time for an entire transmission) of lower-priority channels may be overridden by a CPA of a higher-priority channel (e.g., the CPA of the higher priority channel is selected over the CPA of the lower priority channel). In further embodiments, an earlier transmission is prioritized over a later one. However, for ultra-high-priority transmissions (e.g., an ultra-reliable low latency communication URLLC) with a highest transmission priority, any simultaneous transmission should be overridden by the CPA corresponding to the ultra-high priority transmission. This may be irrespective of the transmission instance or timing. The ultra-high-priority transmission may be identified to the UE through a specific radio network temporary identifier (RNTI), or DCI indicated information.

In certain embodiments, when there is a collision (e.g., where two signals or channels overlap in time) among signals of a same priority level, the following Table 1 may be referenced to determine which CPA of the colliding signals is to be selected or prioritized:

TABLE 1

| For PDSCH | For PDCCH |
|---|---|
| Level-1 (Highest): Already determined transmission > To be detemined transmission; | |
| Level-2: r-PDSCH > PDCCH/SPS PDSCH > i-PDSCH, where r-PDSCH and i-PDSCH is scheduled dynamically in a predefined manner. | |
| Level-3: P-cell > S-cell | Level-3: P-cell > S-cell |
| Level-4 (Lowest): Lowest cell ID for S-cell | Level-4: Lowest cell ID for S-cell |
| | Level-5 (Lowest): CORESET with lowest ID |

In Table 1, each level refers to a priority level for the colliding signals. The priority level may be a predetermined priority level associated with each signal. The term P-cell may refer to a primary cell and the term S-cell may refer to a secondary cell. An already determined transmission may refer to a transmission that is already sent and a to be determined transmission may refer to a transmission that is not yet sent.

Also, as noted in Table 1, for an i-PDSCH, there may be a threshold, N1 in addition to the threshold K. The threshold N1 may be utilized to interpret a minimum decoding latency of a PDCCH scheduling PDSCH. The threshold K may be used to interpret the minimum latency of dynamic beam switching from a DCI scheduling PDSCH to a PDSCH applied when the CPA is indicated by the PDCCH. Also, at level-1, a PDSCH/PDCCH transmission may be determined per time unit (which is either a symbol, slot or transmission occasion). In certain embodiments, the time instance of an i-PDSCH transmission to be determined is associated with a threshold for scheduling offset K, which may be K+the time instance of PDCCH reception. In certain embodiments, the time instance of an i-PDSCH transmission to be determined is associated with a threshold for scheduling offset N1, which may be N1+the time instance of PDCCH reception.

In certain embodiments, priority may be based on a time domain order of a signal transmission time (e.g., when a signal is transmitted) and/or a signal schedule transmission time (e.g., when a signal is scheduled to be transmitted). Also, priority may be based on a time domain order of a signal transmission time plus a time offset and/or a signal schedule transmission time plus a time offset. For example, a signal with an earlier signal transmission time and/or signal schedule transmission time may have a higher priority than a signal with a later signal transmission time and/or signal schedule transmission time, respectively.

As a second exemplary embodiment, CPAs may be determined in accordance with a rule (e.g., a CPA selection rule) based upon the relationship between i-PDSCHs in a transmission period. In a multi-TRP and multi-panel use cases, a UE can be configured by a BS with more than one CORESET group, each of which is associated with one TRP or one panel group. One CORESET group can be associated with beam group(s) and/or antenna group(s) in accordance with a predetermined rule or configuration from a BS. This may be done in order to notify a BS of which UE panels or beam group can be used for subsequent transmission (e.g., in the case of low-coordinated TRPs or a non-ideal backhaul where these TRPs are associated with one or more independent UE panels). This means that that the PDCCH(s) or the PDSCH(s) scheduled by PDCCH in any one of CORESET group are received by the UE through using the associated beam group(s) and antenna group(s). Further, one DL RS resource set (e.g., a CSI-RS resource set, or channel state information interference measurement (CSI-IM) resource set) can be associated with a beam group(s) and/or antenna group by default rules or configuration from a BS. This means that the DL RS resources from the DL RS resource set is received by a UE through its association with beam group(s) and/or antenna group(s).

Therefore, for an i-PDSCH, a CPA can be determined (e.g., selected or prioritized) based on CORESET group separately in the latest slot (e.g., slot used in a current or most recent transmission). For example, the CPA selected for an i-PDSCH may be a CPA associated with the CORESET with the lowest ID for a set of CORESET groups. Stated another way, a PDSCH scheduled by a PDCCH may have a CPA associated with a CORESET with a lowest ID among an associated CORESET group of the PDCCH. For instance, one UE may be configured with two CORESET groups (e.g., CORESET group-a and CORESET group-b), each of which has up to X CORESETs. In an arbitrary slot-n, the CPA of the i-PDSCH may be determined from the CPAs of CORESET group-a and group-b (e.g., the CPA associated with a CORESET of a lowest ID across CORESET group-a and CORESET group-b).

In certain embodiments, a CORESET group ID (as well as its associated time-domain pattern) can be configured by a BS to indicate one associated CORESET group for determining a CPA of an i-PDSCH. In alternate embodiments, the demodulation of an i-PDSCH may be based on a CPA in a CORESET with a lowest ID in a predetermined group of CORESTs.

Figure 4:
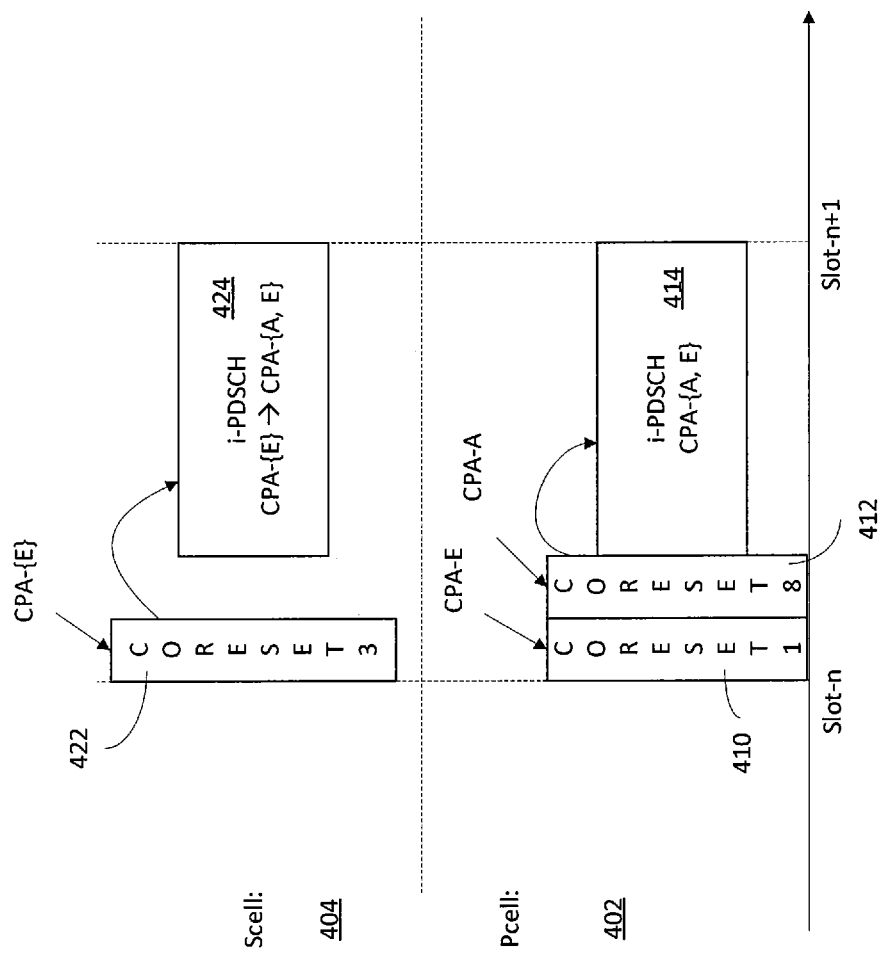
FIG. 4 illustrates channel property assumption determination when there are channel property assumption collisions between i-PDSCHs of a primary cell and a secondary cell, in accordance with some embodiments of the present disclosure.

FIG. 4 illustrates channel property assumption determination when there are channel property assumption collisions between i-PDSCHs of a primary cell (P-cell) 402 and a secondary cell (S-cell) 404, in accordance with some embodiments of the present disclosure. The P-cell 402 includes CORESET-1 410 and CORESET-8 412 which are associated with one i-PDSCH 414. The S-cell 404 includes CORESET-3 422 and one associated i-PDSCH 424 with the CORESET-3 422. As noted above, a PDSCH may be scheduled by the PDCCH. The CPAs associated with CORESET-1 410, CORESET-3 422, and CORESET-8 412 are CPA-{E}, CPA-{E}, and CPA-{A}, respectively.

At the P-cell 402, the CPA for i-PDSCH 414 may be configured as CPA-{A, E} at the BS. Also, CORESET-1 410 and CORESET-8 412 may be from different CORESET groups. At the S-cell 404, the CPA initially associated with the i-PDSCH 424 may be CPA-{E} 422. However, the i-PDSCH 424 at the S-cell 404 may collide with (e.g., overlap with) the i-PDSCH 414 in the P-cell 402. Therefore, in accordance with a CPA selection rule that an i-PDSCH in a P-cell is prioritized over that of an S-cell, the i-PDSCH 424 at the S-cell 404 is overridden (e.g., modified, selected, or determined) as CPA-{A, E}. In certain embodiments where only a single CPA may be associated with a channel, (e.g., CPA-{A, E}) the designation of two or more CPAs (e.g., CPA-{A, E}) may refer to whichever of the two CPAs (e.g., CPA-{A} or CPA-{E}) has the lowest ID. Accordingly, the CPA with the lowest ID may be selected as the CPA for the i-PDSCH 424 414.

As a third exemplary embodiment, CPAs may be determined in accordance with a rule (e.g., a CPA selection rule) based upon the relationship between a PDSCH and a PDCCH in a transmission period. For example, in one embodiment i-PDSCH threshold N1=K. When N1=K, if the entire i-PDSCH is less than threshold K, then the i-PDSCH should use (e.g., select) the CPA of an overlapping PDCCH's CPA. As noted above, a CORESET may include a PDCCH. In such a situation, the overlapping CORESET and i-PDSCH may be selected to have a same CPA.

In other embodiments, if only certain symbols of the i-PDSCH are less than threshold N1=K, then the i-PDSCH should select the CPA of an overlapping PDCCH's CPA. Also, the i-PDSCH part which is equal to or greater than the threshold may be accorded the same priority as that of an r-PDSCH. However, in alternate embodiments, if part of an i-PDSCH does not overlap with a PDCCH, then the CPA of the i-PDSCH should not change (e.g., the CPA should remain as a default CPA associated with the i-PDSCH and not use the CPA of an overlapping PDCCH). In certain embodiments, CORESETs that overlap with at least a portion of an i-PDSCH may be selected to have the same CPA.

Figure 5:
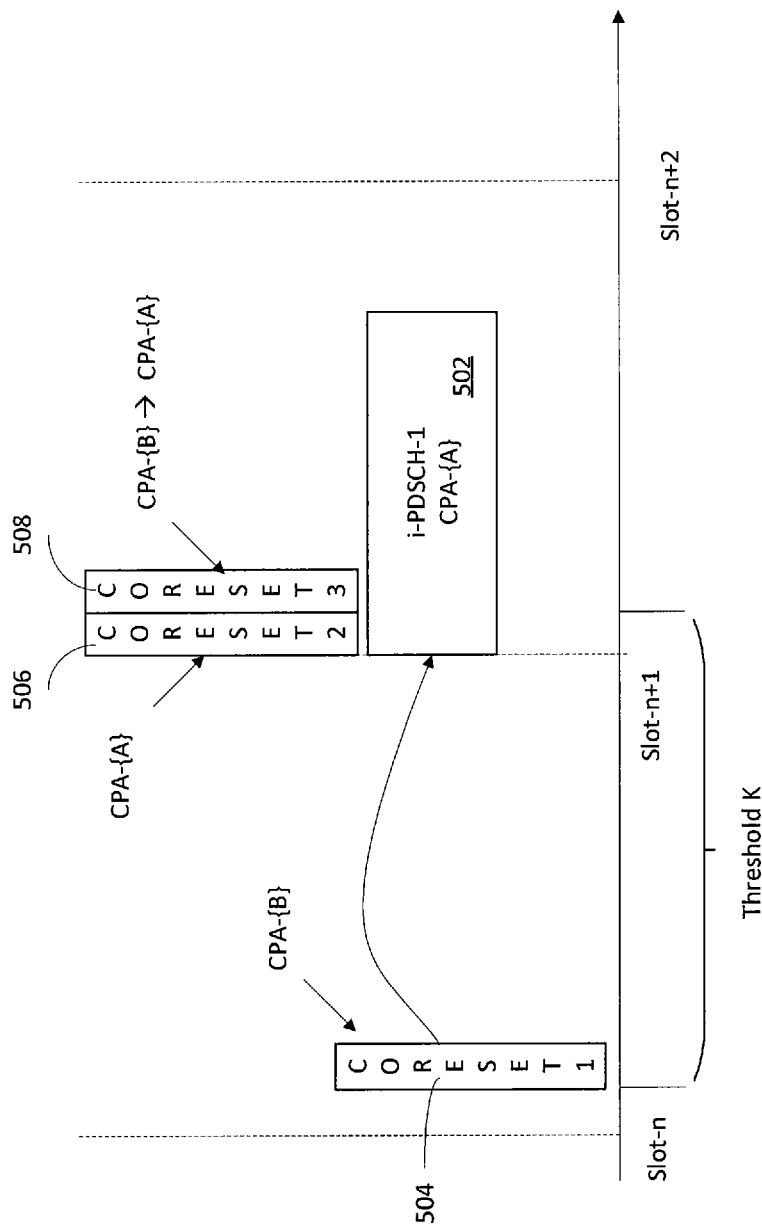
FIG. 5 illustrates channel property assumption determination when there are channel property assumption collisions between an i-PDSCH and a CORESET, in accordance with some embodiments of the present disclosure.

FIG. 5 illustrates channel property assumption determination when there are channel property assumption collisions between an i-PDSCH and a CORESET, in accordance with some embodiments of the present disclosure. As illustrated, i-PDSCH-1 502 is scheduled by the PDCCH in CORESET-1 504, which is associated with CPA-{B}. Also, CORESET-2 506, CORESET-3 508 and i-PDSCH-1 502 is scheduled in slot-n+1. The CPAs of CORESET-2 506 and CORESET-3 508 are CPA-{A} and CPA-{B}, respectively.

As noted above, a CPA selection rule may dictate that the i-PDSCH-1 502 should use the CPA of the CORESET with lowest ID in the latest slot, (e.g., CPA-{A} of CORESET 2, which is lower than CORSET 3). However, in the monitored occasion for CORESET-3 508, the latency from the scheduled PDCCH (e.g., the PDCCH in CORESET-1 504) to i-PDSCH-1 502 is no less than threshold K (e.g., is equal to K). Therefore, i-PDSCH-1 502 should be assumed the same priority rule as an r-PDSCH, as noted above, and the CPA of CORESET 3 508 should be overridden (e.g., selected) from CPA-{B} to be CPA-{A}.

As a fourth exemplary embodiment, CPAs may be determined in accordance with a rule (e.g., a CPA selection rule) based upon the relationship between and i-PDSCH and r-PDSCH in a transmission period. As noted above, according to the rules of priority, an r-PDSCH is prioritized over i-PDSCH in terms of CPA determination.

Figure 6:
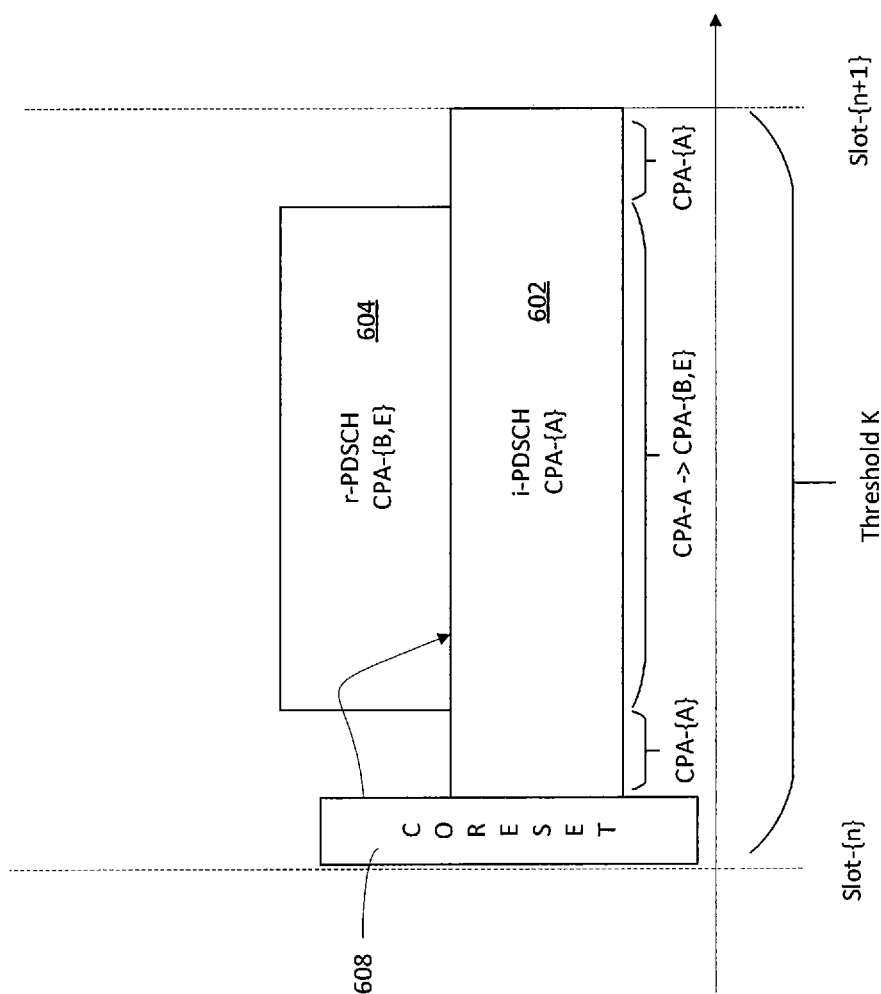
FIG. 6 illustrates channel property assumption determination when there are channel property assumption collisions between an i-PDSCH and a r-PDSCH, in accordance with some embodiments of the present disclosure.

FIG. 6 illustrates channel property assumption determination when there are channel property assumption collisions between an i-PDSCH 602 and a r-PDSCH 604, in accordance with some embodiments of the present disclosure. The threshold K=N1=14 symbols. The CORESET 608 with the lowest ID in the latest slot is associated with CPA-{A}. Also, there is one r-PDSCH 604 overlapping in the time domain over part of the i-PDSCH 602. Consequently, the i-PDSCH 602 has been divided into three parts with different CPAs (e.g., CPA-{A}, CPA-{B,E}, and CPA-{A} in respective parts). As mentioned before, demodulation of a signal or channel with three different CPAs as illustrated in FIG. 6 may negatively affect signal demodulation. However, as will be discussed below, certain transmission rules may apply to the embodiment of FIG. 6 to avoid an issue of demodulating a signal with multiple CPAs.

For example, this issue of multiple CPAs for partial overlap situations between an i-PDSCH and r-PDSCH may be resolved by the following exemplary rules. As an exemplary rule, the r-PDSCH may have the same CPA as an i-PDSCH if the r-PDSCH and i-PDSCH are simultaneously transmitted. In other words, an r-PDSCH may have the same CPA as the CORESET with lowest CORESET ID in the latest slot if a r-PDSCH overlaps with an i-PDSCH in the time domain. Stated yet another way, if a r-PDSCH has a different CPA from the CORESET with the lowest CORESET ID in the latest slot, the i-PDSCH cannot be transmitted with the r-PDSCH simultaneously (e.g., the r-PDSCH and i-PDSCH will not overlap).

As another exemplary rule, when N1 is less than K, the i-PDSCH should be accorded a higher priority over a r-PDSCH that is scheduled but not yet transmitted (e.g., the CPA of the i-PDSCH should be selected for the r-PDSCH).

Figure 7:
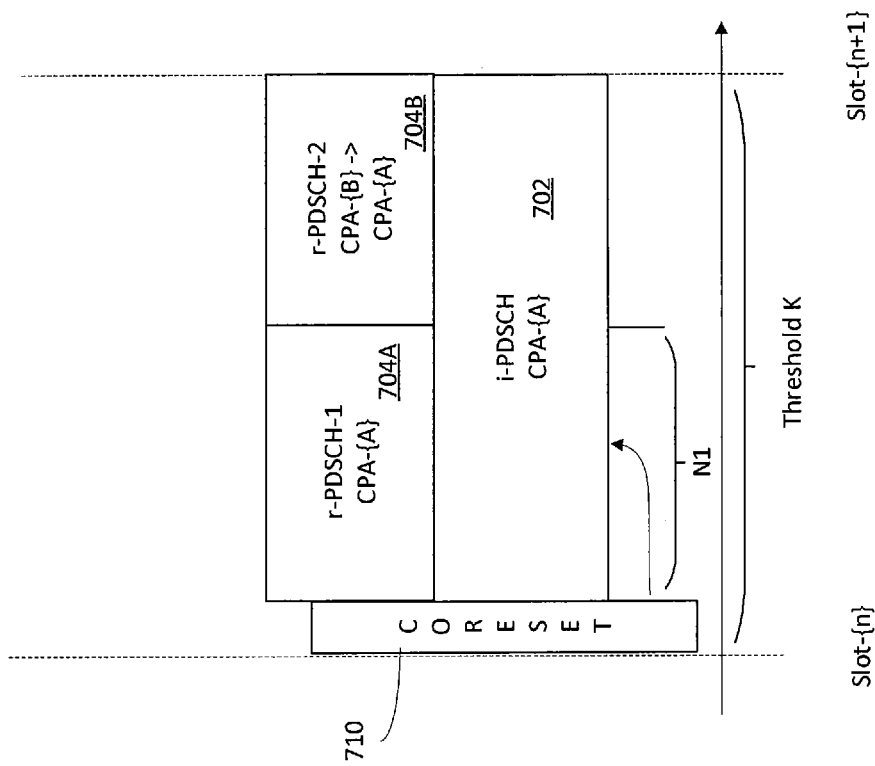
FIG. 7 illustrates another channel property assumption determination when there are channel property assumption collisions between an i-PDSCH and a r-PDSCH, in accordance with some embodiments of the present disclosure.

FIG. 7 illustrates another channel property assumption determination when there are channel property assumption collisions between an i-PDSCH 702 and two r-PDSCHs 704A, 704B, in accordance with some embodiments of the present disclosure. In slot-n there is one CORESET 710, where one PDCCH (contained in the CORESET 710) schedules the i-PDSCH 702 with CPA-{A}, the r-PDSCH-1 704A also with CPA-{A} and the r-PDSCH-2 704B with CPA-{B}. The part of i-PDSCH 702 that is N1 symbols after the CORESET 710 should be assumed as already transmitted from the perspective of r-PDSCH-2 704B. Thus, the PDSCH-2's 704B CPA is overridden as (e.g., selected as) CPA-{A}.

As a fifth exemplary embodiment, CPAs may be determined in accordance with a rule (e.g., a CPA selection rule) based upon the relationship between a multi-slot PDSCH and a PDCCH in a transmission period. A transmission period refers an amount of time in which a transmitted signal or channel (e.g., a PDCCH) may be transmitted. The may be across, for example, a total number of periodic or semi-persistent transmissions. Generally, a PDSCH may be prioritized over a PDCCH. However, if the PDCCH transmission is already determined (e.g., scheduled or in the process of being transmitted), the PDSCH that is not yet transmitted may be accorded a lower priority than the already determined or transmitted PDCCH.

Figure 8:
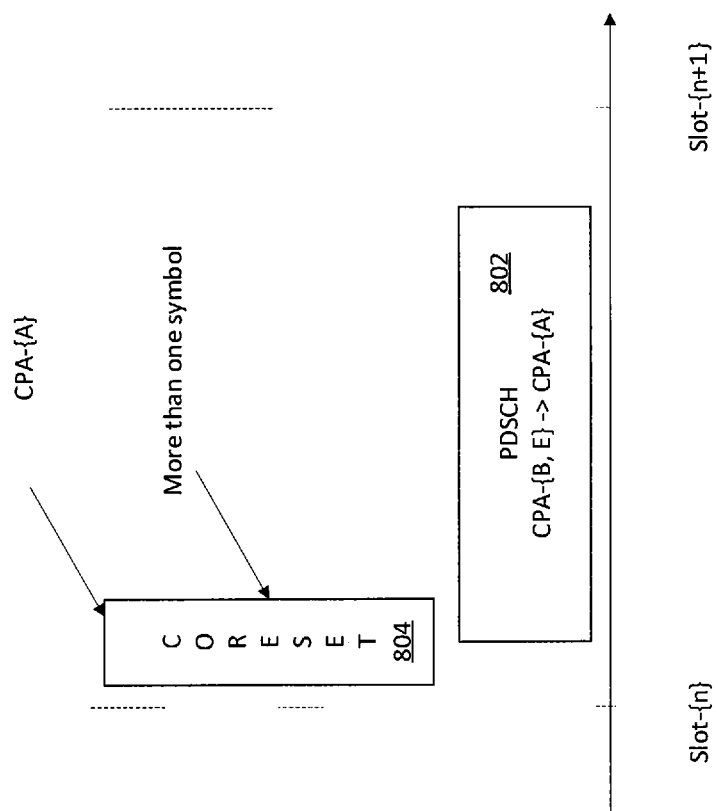
FIG. 8 illustrates channel property assumption determination when there are channel property assumption collisions between a one slot PDSCH and a PDCCH, in accordance with some embodiments of the present disclosure.

FIG. 8 illustrates channel property assumption determination when there are channel property assumption collisions between a one slot PDSCH 802 and a PDCCH, in accordance with some embodiments of the present disclosure. As illustrated, the CORESET 804 (e.g., a CORESET that includes the PDCCH) may occupy two consecutive symbols. The CORESET 804 may be associated with CPA-{A}. The latter symbol of the CORESET 804 may overlap with the first symbol of the PDSCH 802 with CPA-{B, E}. The PDSCH 802 may be associated with CPA-{B, E}.

According to the above referenced rule of the fifth exemplary embodiment, the PDSCH's CPA should be overridden to (e.g., selected to) CPA-{A} from CPA-{B,E}. This is because the PDSCH 802 that is not yet transmitted (e.g., transmitted later) than the already transmitted PDCCH (e.g., CORESET 804) is accorded a lower priority than the already transmitted PDCCH (e.g., CORESET 804).

Figure 9:
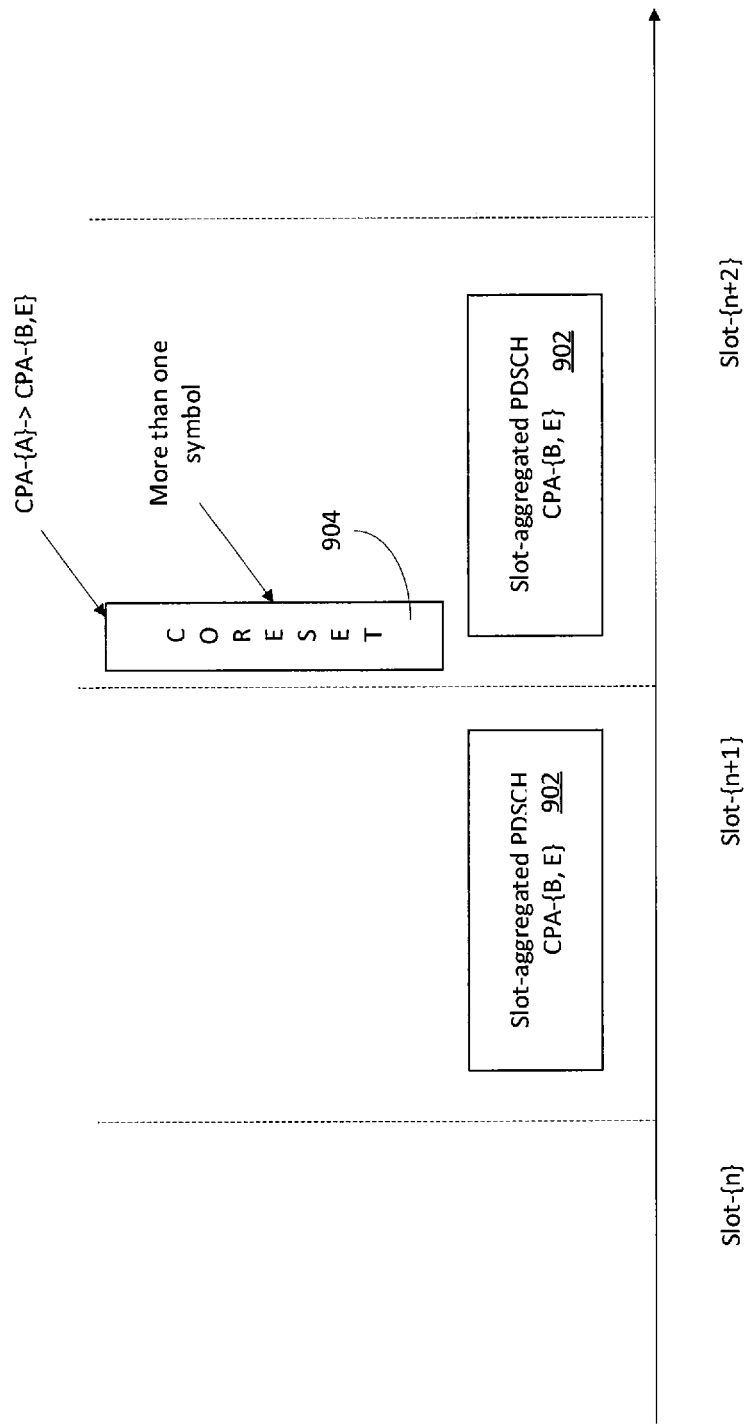
FIG. 9 illustrates channel property assumption determination when there are channel property assumption collisions between a slot aggregated PDSCH and a PDCCH, in accordance with some embodiments of the present disclosure.

FIG. 9 illustrates channel property assumption determination when there are channel property assumption collisions between a slot aggregated PDSCH 902 and a PDCCH, in accordance with some embodiments of the present disclosure. For the slot-aggregated PDSCH 902, or the PDSCH 902 that spans multiple slots, the associated CPA may be determined from the first symbol of the PDSCH 902. Also, the CPA is kept unchanged during its transmission period. As illustrated, in slot-{n}, a two-slot-aggregated PDSCH 902 is scheduled for transmission. In slot-{n+1}, there is one CORESET 904 and an aggregated PDSCH 902, where the reception of the CORESET 904 is earlier than the PDSCH 902. However, the PDSCH 902 has already been transmitted (e.g., already been determined) in slot-{n}. Therefore, the CPA of the CORESET 904 should follow (e.g., adapt to, or be overridden by) the slot-aggregated PDSCH's 902 CPA (e.g., the CPA of the slot-aggregated PDSCH 902 in slot-{n}).

As a sixth exemplary embodiment, CPAs may be determined in accordance with a rule (e.g., a CPA selection rule) based upon the relationship between an aperiodic channel state information reference signal (AP-CSI-RS) resource set and either a PDCCH or a semi-persistent scheduled PDSCH (SPS PDSCH) in a transmission period. An AP-CSI-RS may be transmitted (e.g., triggered) as a CSI-RS resource set (e.g., a CSI-RS resource set with more than one CSI-RS resource). In certain embodiments, a single AP-CSI-RS resource may be transmitted simultaneously with, but have different CPAs with, a PDCCH or semi-persistent PDSCH. In such situations, the CPA for the PDCCH or SPS PDSCH may be overridden with (e.g, selected as) the CPA of the AP-CSI-RS (e.g., the CPA of the CSI-RS resource set).

Figure 10:
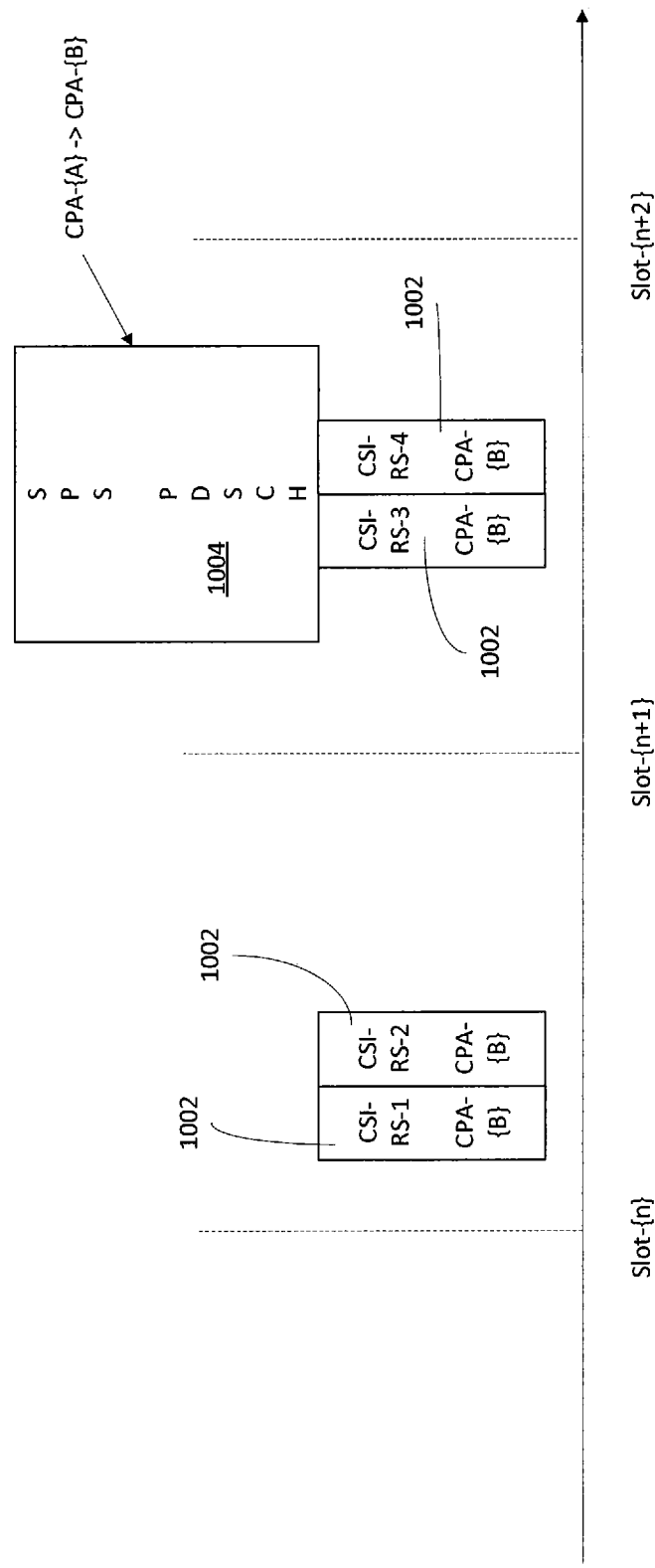
FIG. 10 illustrates channel property assumption determination when there are channel property assumption collisions between a time domain resource set, in accordance with some embodiments of the present disclosure.

FIG. 10 illustrates channel property assumption determination when there are channel property assumption collisions between a time domain resource set, in accordance with some embodiments of the present disclosure. As illustrated, one AP-CSI-RS resource set 1002 configured with tracking reference signaling (TRS) info is transmitted or triggered. Stated another way, the AP-CSI-RS resource set 1002 configured with one IE containing an entry termed "TRS info" is transmitted. The AP-CSI-RS resource set 1002 may be configured with four periodic CSI-RS resources 1002 transmitted over two consecutive slots with two periodic CSI-RS resources in each slot, (e.g., CSI-RS-1/2/3/4). A higher layer parameter (e.g., aperiodicTriggeringOffset, configured by an associated BS through radio resource control (RRC) signaling) indicates the triggering offset for the first slot. If the first CSI-RS transmission is earlier than one PDCCH or SPS PDSCH 1004, the PDCCH or SPS PDSCH 1004 follows (e.g., is overridden by or is selected to be) the CPA of the AP-CSI-RS resource set 1002. Stated another way, the CPA of the overlapping PDCCH or SPS PDSCH 1004 is overridden by (e.g., selected to be) the CPA of the AP-CSI-RS resource set 1002 (e.g., the constituent CSI-RS resources of the API-CSI-RS resource set 1002). For example, the API-CSI-RS resource set may be associated with CPA-{B} while the SPS PDSCH may be originally associated with CPA-{A}, but is then changed to (e.g., overridden by or selected to be) CPA-{B} in accordance with the above referenced CPA selection rule. Accordingly, the SPS PDSCH 1004 may have the same CPA as that of the AP-CSI-RS resource set 1002.

As noted above, in various embodiments, while more than one DL RS or channels are transmitted or received simultaneously and the number of different CPAs of these DL RSs and channels (or, from one antenna group) is more than a threshold of a maximum number of channels that may be transmitted per group, at least one of following should be supported: irrespective of fully or partially overlapped cases, the CPA corresponding to the whole transmission period of lower-priority channels should be overridden by the higher-priority one. Also, from the perspective of CPA selection, an already determined transmission (e.g., a transmission already transmitted or scheduled for currently transmission) should be prioritized over a to-be-determined transmission (e.g., a transmission not yet transmitted or not scheduled for current transmission). The DL RS or channel transmission may be determined per unit time (e.g., as either a symbol, slot or transmission occasion). Furthermore, the CPA determined for one RS resource set should be based on the earliest symbol/transmission corresponding to any one resource within the set. However, for ultra-high-priority transmissions with a highest transmission priority, any simultaneous transmission should be overridden by the CPA corresponding to the ultra-high priority transmission, irrespective of the transmission instance. As discussed above, an ultra-high-priority transmission is identified to a UE through specific radio network temporary identifier (RNTI), DCI indicated information, and the like. As noted above, priority can be associated with DL RSs and channels associated with a group, (e.g., beam group, antenna group, or CORESET group) or associated with entire DL RSs and channels.

In a number of embodiments, a UE can be configured to process or support more than one CORESET group. Also, the CPA for an i-PDSCH can be determined from a CORESET group in the latest slot. Furthermore, one CORESET group can be associated with beam group(s) and antenna group(s) by predetermined rules or configurations as determined by a BS. Additionally, PDCCH(s), or the PDSCH(s) scheduled by a PDCCH in a CORESET, may be received by a UE using beam group(s) and/or antenna group(s) from a BS.

In certain embodiments, one CORESET group may be associated with only one beam/antenna group. However, one beam/antenna group may be associated with more than one CORESET group. Also, one DL RS resource set (e.g., CSI-RS resource set or CSI-IM resource set) can be associated with beam group(s) and/or antenna group(s) by predetermined rules or configurations as determined by a BS. Furthermore, DL RS resources from a resource set (e.g., a CSI-RS resource set or the CSI-IM resource set) may be received by a UE using beam group(s) and/or antenna group(s) from a BS.

In numerous embodiments, if a length of transmission for an i-PDSCH transmission is less than a threshold, the i-PDSCH may select a CPA of a PDCCH overlapped with the i-PDCCH. However, if a length of transmission for an i-PDSCH transmission is equal to or more than the threshold, the i-PDSCH may assume a same priority as a r-PDSCH. Also, where a length of transmission for an i-PDSCH transmission is less than the threshold, all CORESETs overlapped with the i-PDSCH may have (e.g., be selected to have or have their original CPA be overridden by) the CPA of the i-PDSCH.

In additional embodiments, a CPA of an i-PDSCH may be determined by that of r-PDSCH. For example, an r-PDSCH may be selected to have the same CPA as an i-PDSCH if the r-PDSCH and the i-PDSCH are simultaneously transmitted. As another example, an r-PDSCH may be selected to have the same CPA as a CORESET with a lowest CORESET ID in a latest slot if a r-PDSCH overlaps with an i-PDSCH. As yet another example, if an r-PDSCH has a different CPA from the CORESET with lowest CORESET ID in the latest slot, an i-PDSCH cannot be transmitted with the r-PDSCH simultaneously.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, comprising:
receiving, from a communication node, multiple signals and associations between each of multiple signals with at least one associated channel property assumption (CPA), wherein the multiple signals are at least partially overlapped in a time domain;
selecting at least one CPA based on a selection rule, wherein the at least one selected CPA is selected from a set of CPAs, wherein the set of CPAs comprises at least one associated CPA for each of the multiple signals, wherein each CPA of the set of CPAs is determined according to a spatial filter, and wherein the selection rule for a first signal of the multiple signals is based on a time domain order of: a first transmission time of the first signal and a second transmission time of a signal scheduling the first signal; and
receiving at least one signal of the multiple signals from a communication node based on the at least one selected CPA,
wherein the selection rule for the first signal is based on the time domain order of at least of one of the following: the first transmission time of the first signal plus a first offset, and the second transmission time of the signal scheduling the first signal plus a second offset.

2. The method of claim 1, wherein each CPA of the set of CPAs is further determined according to at least one of: a beam, a beam group, one quasi-co-location (QCL), one reference signal with regard to a spatial parameter, one transmission configuration indicator (TCI), one antenna group, and one reference signal set.

3. The method of claim 1, wherein the selection rule is based on having no less than two CPAs of the set of CPAs be at least one of: associated with different beam groups, associated with a single antenna group, and associated with a single control resource set (CORESET) group.

4. The method of claim 1, wherein the selection rule is based on a priority of each signal of the multiple signals.

5. The method of claim 1, wherein the transmission time is a time of a first symbol in a transmission.

6. The method of claim 1, wherein the selection rule for one signal of the multiple signals is based on a portion of the multiple signals, wherein the portion of the multiple signals are overlapped in first symbol of the one signal in the time domain.

7. The method of claim 1, wherein the selection rule for one signal of the multiple signals is based on a result of comparison between a time offset between the one signal of the multiple signals and scheduled signaling related to a second signal of the multiple signals and a threshold, wherein the second signal of the multiple signals comprises a second scheduling offset that is less than the threshold.

8. The method of claim 1, wherein the selection rule is further based on a total number of symbols or slots corresponding to each signal of the multiple signals.

9. The method of claim 1, wherein the associating each of the multiple signals is received as an association from the communication node that transmits the multiple signals.

10. The method of claim 1, wherein each of the multiple signals comprises one or more of the following:
a physical downlink shared channel (PDSCH), a physical downlink control channel (PDCCH), a channel-state-information reference signal (CSI-RS), and a physical broadcast channel/synchronization signal (PBCH/SS).

11. A method performed by a communication node, comprising:
generating associations between each of multiple signals and at least one associated channel property assumption (CPA), wherein the multiple signals are at least partially overlapped in a time domain;
transmitting the associations to a communication device; and
transmitting the multiple signals to the communication device, wherein the communication device is configured to:
select at least one CPA based on a selection rule, wherein the at least one selected CPA is selected from a set of CPAs, wherein the set of CPAs comprises at least one associated CPA for each of the multiple signals, wherein each CPA of the set of CPAs is determined according to a spatial filter, and wherein the selection rule for a first signal of the multiple signals is based on a time domain order of: a first transmission time of the first signal and a second transmission time of a signal scheduling the first signal; and
receive at least one signal of the multiple signals based on the at least one selected CPA,
wherein the selection rule for the first signal is based on the time domain order of at least of one of the following: the first transmission time of the first signal plus a first offset, and the second transmission time of the signal scheduling the first signal plus a second offset.

12. The method of claim 11, wherein each CPA of the set of CPAs is further determined according to at least one of: a beam, a beam group, one quasi-co-location (QCL), one reference signal with regard to a spatial parameter, one transmission configuration indicator (TCI), one antenna group, and one reference signal set.

13. The method of claim 11, wherein the selection rule is based on having no less than two CPAs of the set of CPAs be at least one of: associated with different beam groups, associated with a single antenna group, and associated with a single control resource set (CORESET) group.

14. A communication device, comprising:
a transceiver configured to receive, from a communication node, multiple signals and associations between each of the multiple signals with at least one associated channel property assumption (CPA), wherein the multiple signals are at least partially overlapped in a time domain; and
at least one processor configured to:
associate each of multiple signals with at least one associated CPA; and
select at least one CPA based on a selection rule, wherein the at least one selected CPA is selected from a set of CPAs, wherein the set of CPAs comprises at least one associated CPA for each of the multiple signals, wherein each CPA of the set of CPAs is determined according to a spatial filter, and wherein the selection rule for a first signal of the multiple signals is based on a time domain order of:
a first transmission time of the first signal and a second transmission time of a signal scheduling the first signal; and a receiver configured to:
receive at least one signal of the multiple signals from a communication node based on the at least one selected CPA,
wherein the selection rule for the first signal is based on the time domain order of at least of one of the following: the first transmission time of the first signal plus a first offset, and the second transmission time of the signal scheduling the first signal plus a second offset.

15. The communication device of claim 14, wherein the selection rule is based on a priority of each signal of the multiple signals.

16. The communication device of claim 14, wherein each CPA of the set of CPAs is further determined according to at least one of: a beam, a beam group, one quasi-co-location (QCL), one reference signal with regard to a spatial parameter, one transmission configuration indicator (TCI), one antenna group, and one reference signal set.

17. A communication node, comprising:
at least one processor configured to:
generate associations between each of multiple signals and at least one associated channel property assumption (CPA), wherein the multiple signals are at least partially overlapped in a time domain; and
a transmitter configured to:
transmit the associations to a communication device; and
transmit the multiple signals to the communication device, wherein the communication device is configured to:
select at least one CPA based on a selection rule, wherein the at least one selected CPA is selected from a set of CPAs, wherein the set of CPAs comprises at least one associated CPA for each of the multiple signals, wherein each CPA of the set of CPAs is determined according to a spatial filter, and wherein the selection rule for a first signal of the multiple signals is based on a time domain order of: a first transmission time of the first signal and a second transmission time of a signal scheduling the first signal; and
receive at least one signal of the multiple signals based on the at least one selected CPA,
wherein the selection rule for the first signal is based on the time domain order of at least of one of the following: the first transmission time of the first signal plus a first offset, and the second transmission time of the signal scheduling the first signal plus a second offset.

18. The communication node of claim 17, wherein each CPA of the set of CPAs is further determined according to at least one of: a beam, a beam group, one quasi-co-location (QCL), one reference signal with regard to a spatial parameter, one transmission configuration indicator (TCI), one antenna group, and one reference signal set.

19. The communication node of claim 17, wherein the selection rule is based on having no less than two CPAs of the set of CPAs be at least one of: associated with different beam groups, associated with a single antenna group, and associated with a single control resource set (CORESET) group.

* * * * *